July 21, 1925.

P. KUCERA 1,546,544

FURNACE

Filed Jan. 27, 1920  3 Sheets-Sheet 1

Inventor
Peter Kucera
By Attorney
George Ramsey

July 21, 1925.

P. KUCERA

FURNACE

Filed Jan. 27, 1920

Inventor
Peter Kucera

By  Attorney
George Ramsey

Patented July 21, 1925.

1,546,544

UNITED STATES PATENT OFFICE.

PETER KUCERA, OF CONNELLSVILLE, PENNSYLVANIA, ASSIGNOR TO CAPSTAN GLASS COMPANY, OF CONNELLSVILLE, PENNSYLVANIA, A CORPORATION OF DELAWARE.

FURNACE.

Application filed January 27, 1920. Serial No. 354,359.

*To all whom it may concern:*

Be it known that I, PETER KUCERA, a citizen of the United States, residing at Connellsville, in the county of Fayette, State of Pennsylvania, have invented certain new and useful Improvements in Furnaces, of which the following is a specification.

This invention relates broadly to furnace constructions and more specially to furnace constructions adapted for use in the manufacture of glassware.

The principal object of the present invention is to provide a construction adapted for automatic disposal of a stream of glass which is not being used and which it is not desirable to stop.

Another object of the present invention is a construction adapted for automatic disposal of molten glass and for use with glass furnaces which are arranged for delivering glass to an automatic feeding device in such manner that it is not desirable to stop the glass outlet when it is necessary to remove the feeding device or mold table for adjustment or repair.

A still further object of the present invention is an improvement relating to glass furnaces which contemplates the arrangement of a floor for supporting machines for glass manufacturing and the provision of a trench beneath the floor and adapted to be filled with water and so arranged as to receive portions of the glass which may issue from the furnace and which are not being used by the glass machinery.

A more specific object of the present invention is a construction of the character specified wherein an opening is provided in the floor adjacent the glass machines, with a reservoir for water arranged beneath the opening in such manner that discarded particles of plastic glass may be disposed of through the opening directly into the water receptacle.

A still further and more specific object of the present invention is a device of the character specified which further contemplates a spout leading from the interior of the glass furnace and being adapted to convey glass to an orifice from which the glass is normally disposed of by suitable feeding mechanisms, and an opening beneath the orifice located so that discarded glass issuing from the orifice may drop directly through the opening into a receptacle from which the accumulation of glass may be removed as desired.

Heretofore in the manufacture of glassware, either by machinery or manually, there was more or less of an accumulation about the working end of the furnace of broken pieces, and hot plastic charges of glass when the molding machine is withdrawn, and which pieces and charges usually tend to drop around the pressing or manipulating machines. Where automatic feeding devices are utilized it is not unusual that the feeding devices must be stopped for adjustment or slight repairs, and if it is intended that the operation of the devices be resumed in a relatively short time usually the orifice from which the glass issues is not stopped during the repairing period because of liability of the glass freezing in the orifice if it is stopped. In view of this fact it is customary to permit the glass to stream out on a dirt floor or sometimes into the depression adjacent the outlet of the spout. From time to time a workman will insert an iron hook in the discharged glass and will transfer the molten or plastic glass to a large kettle of water where the glass cools and breaks up into cullet. This manipulation is both laborious and expensive and furthermore interferes with the operation of machines and the movement of workmen around the machines and through the factory.

The present invention overcomes the difficulties in the known art by providing a construction wherein the glass issuing from the spout may fall directly through an opening into a suitable receptacle, preferably a receptacle comprising a trench filled with water. This opening is so disposed as to facilitate the removal of broken glass particles by pushing such articles through the opening and permitting them to fall into the receptacle. In the preferred form, which will hereinafter be explained in detail, the glass molding and charging machines are preferably arranged adjacent one end of the furnace upon a raised floor or platform through which the discharge opening specified is provided. Beneath the raised floor or platform is a second floor in which a trench is provided directly beneath the glass trough discharge opening or openings as the case may be. This trench is maintained partly filled with water so that when the hot glass drops into the trench it is immediately cooled, and breaks up into cullet which is utilized for further manufacture of glass. As the cullet accumulates in the trench it is removed from time to time as may be desired and is remelted in the furnace. By this construction it is evident that the operating floor for the glass manipulating machines and charging devices is at all times free from small particles of glass which may float in the air and be injurious to health.

Figure 1:
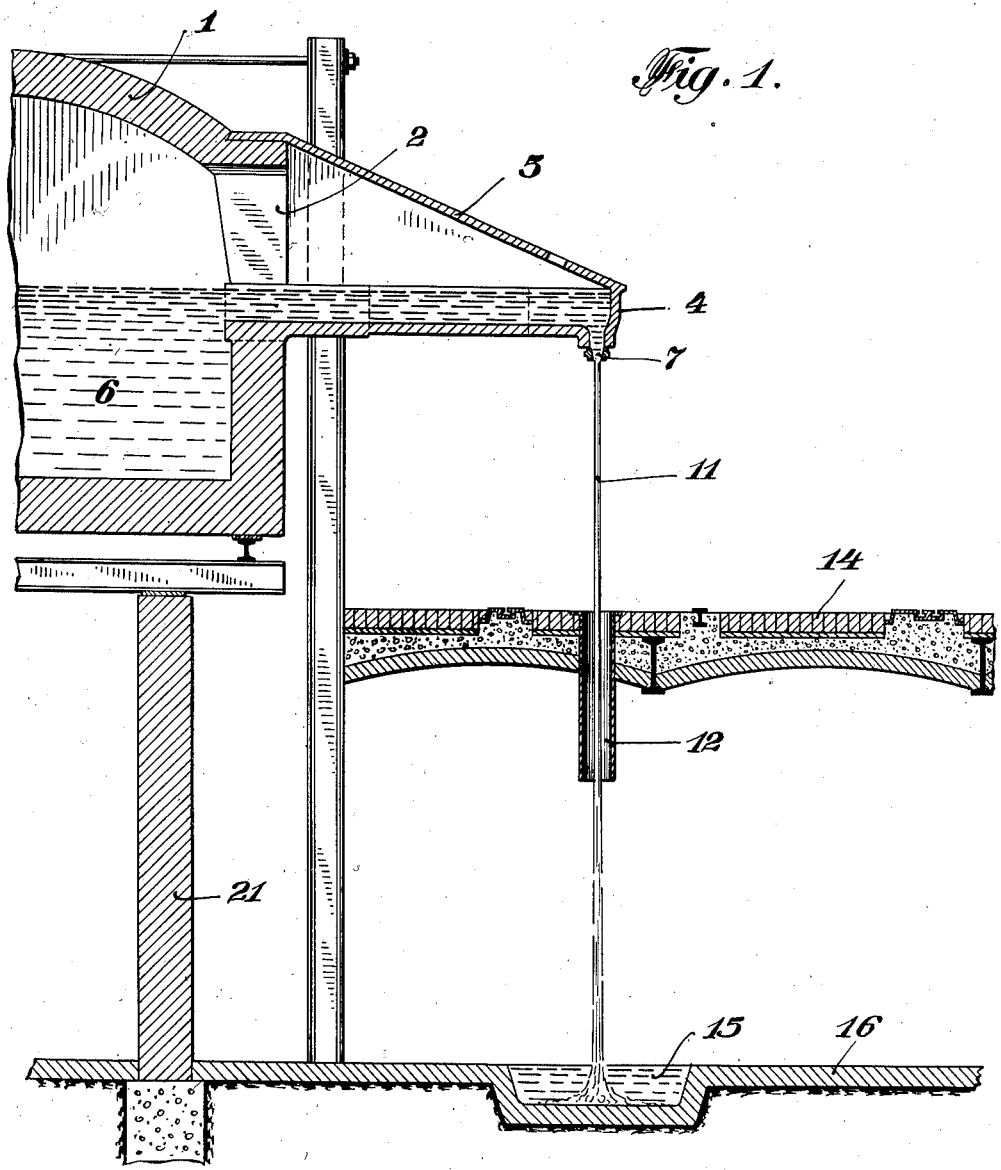
Figure 1 is a sectional view through a portion of a glass furnace, an upper floor, and a lower floor, with the glass manipulating and charging machines omitted and showing a stream of glass running from the orifice, through the opening, into the trough.
Figure 2:
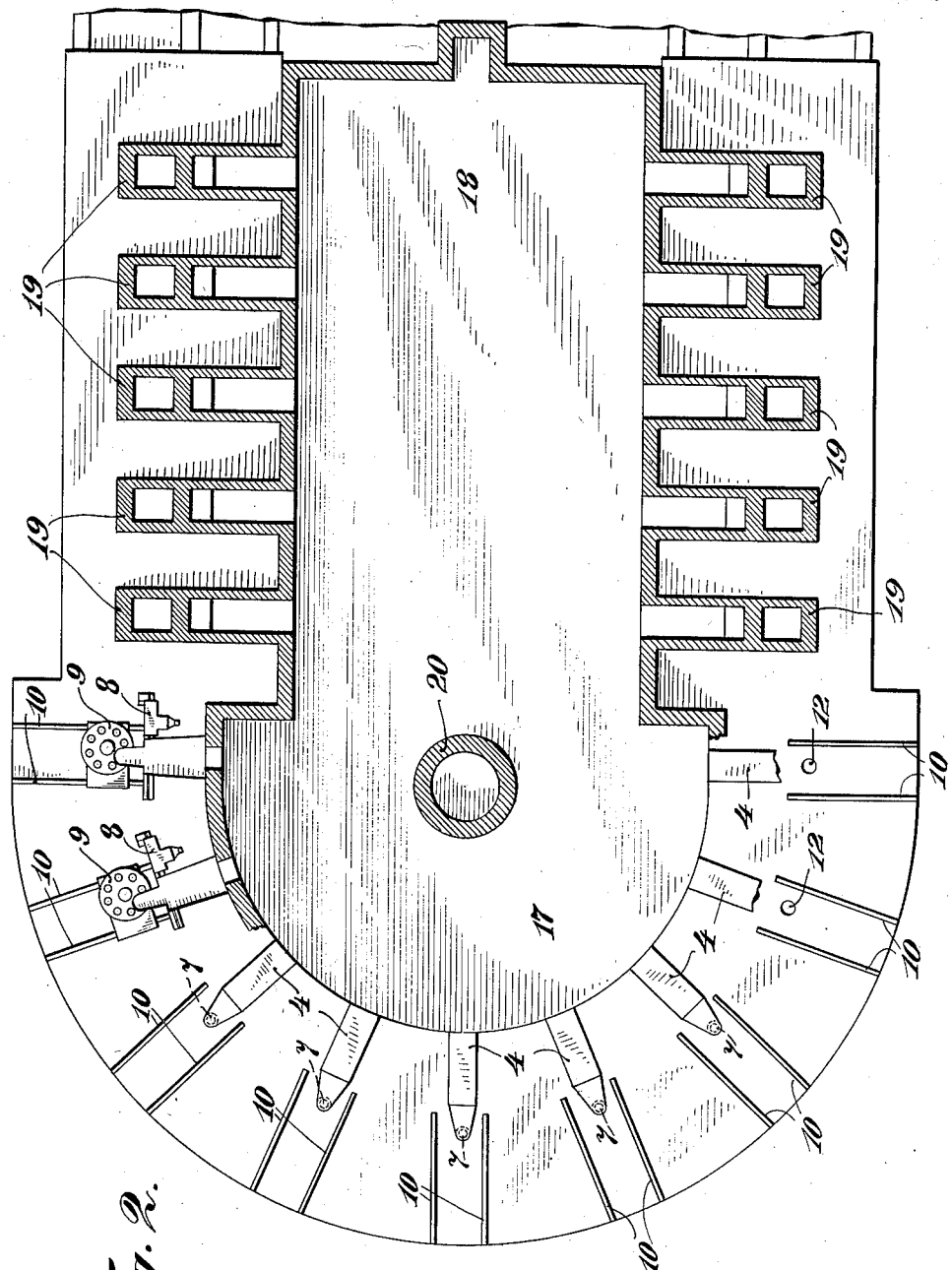
Figure 2 is a diagrammatical plan view of a glass furnace showing the glass manipulating machines in position, and with certain of the spouts broken away to illustrate the openings in the floor adjacent the machines.

Referring now to the drawings and more especially to Figures 1 and 2, the glass furnace 1 is provided with an outlet opening 2 to which is attached a spout 4 that is provided with a cover 5. The glass 6 in the furnace is adapted to be maintained at such a level as will maintain glass within the spout 4 and this glass is adapted to issue from an orifice 7 and to be controlled by and operated upon by suitable charging machines 8 which are adapted to provide the glass charges to be fed to the glass manipulating machines 9 that are mounted on tracks 10. The manipulating machines are quite heavy and where it is necessary to stop the machines, to change the molds or for any other reason, it is desirable and necessary to roll such machine on its tracks away from the furnace in order that the glass issuing from the orifice 7 or from the charge-forming machine will not drop upon the pressing or blowing machines. Under some conditions it may be desirable or necessary to stop the charge-forming or controlling devices which are adapted to prepare the charges for the molding mechanism, and under these conditions it is best to permit the glass to issue from the orifice 7 in the form of a stream 11. This stream 11 falls through the opening 12 in the floor 14 which carries the manipulating and charging machines and drops directly into the trough 15 on the lower floor 16. Preferably this trough is filled with water and the glass piles up on the bottom of the trough in the form of broken particles, known as "cullets," to be used over again in the furnace.

Figure 3:
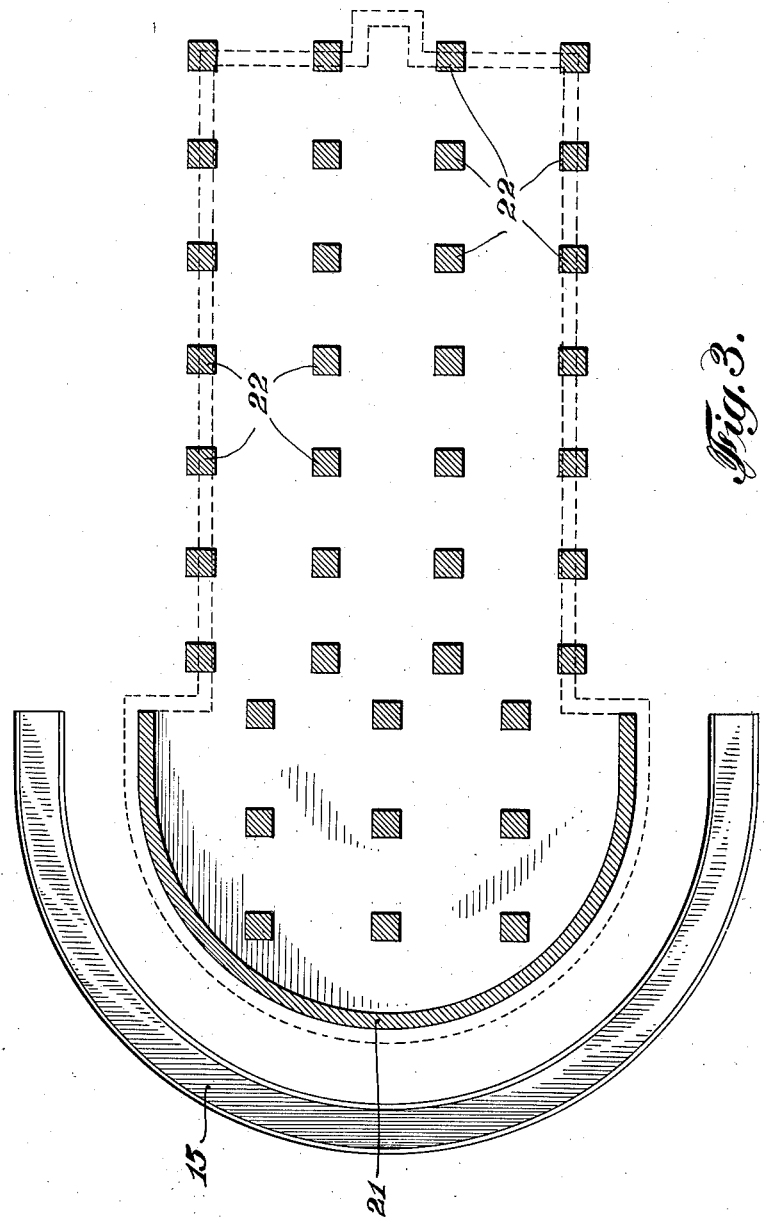
Figure 3 is a plan view of the lower floor showing the relation of the trough to the tank shape and construction.

The glass furnace may be provided with a circular shaped working end 17 as shown in Figure 1 and with a rectangular charging and melting portion 18. It may also be provided with suitable conduits 19 for leading in fuel and air and with a chimney 20 to carry away products of combustion. The outlet spouts 4 may be radially arranged and the openings 12 beneath the orifice 7 may be arranged to lie in a circle. In the construction as above specified, the water receptacle may take the form shown in Figure 3 and comprise an arcuate trough 15 which is adjacent a bridge wall 21 which supports the forward end of the furnace. Suitable pillars or posts 22 may be provided for the general support of the furnace.

From the foregoing description it will be seen that the present invention provides a construction wherein discarded glass which issues from the furnace is automatically disposed of, and wherein broken and rejected or spoiled glassware may be removed from the working floor with a minimum amount of effort, and removed entirely from the working floor where workmen are moving about.

Having described my invention what I claim is:

1. In a furnace construction the combination of a melting furnace, a spout for leading material from the furnace to suitable handling machines, said spout being provided with an orifice, a floor adjacent the said furnace, said floor being provided with an opening directly beneath the said orifice, and a receptacle beneath said opening and adapted to receive material issuing from said orifice and intended to be discarded.

2. In a furnace construction the combination of a melting furnace, a conduit for leading material from the furnace to suitable handling machines, said conduit being provided with a discharge opening, a floor adjacent the said furnace, said floor being provided with a passageway directly beneath the said discharge opening, and a water-filled receptacle beneath said passageway and adapted to receive material issuing from said discharge opening and intended to be discarded.

3. In a glass house construction, a furnace, a spout leading from said furnace, said spout being provided with an orifice, a floor for sustaining glass manufacturing machines, said floor being provided with an opening beneath said orifice, a lower floor beneath the first mentioned floor, and a trough adapted to be filled with water in said lower floor and directly beneath the opening in the upper floor.

4. In a glass house construction, a floor for sustaining glass manufacturing machines, said floor being provided with an opening, a lower floor beneath the first mentioned floor, and a trough adapted to be filled with water in said lower floor and directly beneath the opening in the upper floor.

5. In a glass house construction, a furnace, a spout leading from said furnace, said spout being provided with an orifice, a floor for sustaining glass manufacturing machines, a plurality of glass machines arranged in an arc on said floor, said floor being provided with an opening adjacent each machine beneath said orifice, a lower floor beneath the first mentioned floor, and an arcuate trough adapted to be filled with water in said lower floor and directly beneath the openings in the upper floor.

6. In a glass house construction, a furnace, a spout leading from said furnace, said spout being provided with an orifice, a floor for sustaining glass manufacturing machines, said floor being provided with an opening beneath said orifice, a lower floor beneath the first mentioned floor, and a trough having inclined side walls and adapted to be filled with water and directly beneath the opening in the upper floor, said trough being located in the lower floor and constructed to receive glass dropped through the openings in the first mentioned floor.

7. In a glass house construction, a floor for sustaining glass manufacturing machines, a plurality of glass machines arranged in an arc on said floor, said floor being provided with an opening adjacent each machine, a lower floor beneath the first mentioned floor, and an arcuate trough adapted to be filled with water in said lower floor and directly beneath the openings in the upper floor.

8. In a glass house construction, a floor for sustaining glass manufacturing machines, a plurality of glass machines arranged in an arc on said floor, said floor being provided with an opening adjacent each machine, a lower floor beneath the first mentioned floor, and an arcuate trough having inclined side walls and adapted to be filled with water and directly beneath the openings in the upper floor, said trough being located in the lower floor and constructed to receive glass dropped through the openings in the first mentioned floor.

9. In a glass house construction, a furnace, a spout leading from said furnace, said spout being provided with an orifice, a work floor, and a trough adapted to be filled with water and located beneath said orifice, the bottom of said trough being below the work floor.

10. In a glass house construction, a furnace, a spout leading from said furnace, said spout being provided with an orifice, a work floor, and a stationary trough adapted to be filled with water and located beneath said orifice, the top of said trough being below the work floor.

11. In a glass house construction, a furnace, a spout leading from said furnace, said spout being provided with an orifice, a work floor, glass machines on said work floor and adjacent to said spout, means to permit said machines to be withdrawn from adjacent said spout, and a trough adapted to be filled with water and located beneath said orifice, the bottom of said trough being below the work floor.

12. In a glass house construction, a furnace, a spout leading from said furnace, said spout being provided with an orifice, a work floor, glass machines on said work floor and adjacent to said spout, means to permit said machines to be withdrawn from adjacent said spout, and a stationary trough adapted to be filled with water and located beneath said orifice.

13. In a glass house construction, a furnace, a spout leading from said furnace, an orifice provided in said spout and adapted to discharge plastic glass from said spout, a work floor, a water trough located directly below said orifice and below the level of said work floor whereby glass flowing freely from said orifice will drop into the water in said trough.

14. A furnace organization comprising a receptacle, a floor having an opening above said receptacle and a furnace for discharging hot material, said material being discharged above said opening.

15. A furnace organization comprising a receptacle, a floor having an opening over said receptacle and a furnace having a discharged orifice over said opening.

16. A furnace organization comprising a water-filled receptacle, a floor having an opening over said receptacle and a melting furnace positioned to discharge molten material over said opening.

17. A furnace organization comprising a floor having an opening, a furnace having a discharge point over said opening, and a receptacle beneath said floor for receiving material discharged from said furnace and passing through said opening.

PETER KUCERA.